United States Patent [19]
Dettling et al.

[11] 3,897,008
[45] July 29, 1975

[54] LIQUID FUEL INJECTOR SYSTEM
[75] Inventors: Ronald F. Dettling, China Lake, Calif.; Donald G. Nyberg, Burton, Wash.
[73] Assignee: The United States of America as represented by the Secretary of the Navy, Washington, D.C.
[22] Filed: Sept. 24, 1969
[21] Appl. No.: 862,641

[52] U.S. Cl. ............ 239/410; 239/416; 60/39.47 A
[51] Int. Cl.² ............................................ B05B 7/12
[58] Field of Search ........................... 239/408–412; 60/39.74, 258

[56] References Cited
UNITED STATES PATENTS

| | | | |
|---|---|---|---|
| 2,532,711 | 12/1950 | Goddard | 60/39.74 |
| 3,074,231 | 1/1963 | Klein | 60/39.74 |
| 3,170,286 | 2/1965 | Stein | 60/258 |
| 3,391,533 | 7/1968 | Mageean | 239/410 |
| 3,421,700 | 1/1969 | Seamans | 60/258 |
| 3,527,056 | 9/1970 | Hoffman | 239/410 |
| 3,534,909 | 10/1970 | Paine | 239/408 |

Primary Examiner—Samuel Feinberg
Attorney, Agent, or Firm—R. S. Sciascia; Roy Miller; Gerald F. Baker

[57] ABSTRACT

A novel injector is provided for a variable thrust rocket engine using the annular-stream variable-area concept to give fast response and shut-off capability. This is accomplished by a simple arrangement of an annular metering sleeve which surrounds the central pintle such that a fuel and an oxidizer are separately and simultaneously metered to the combustion area. The metering sleeve, and contoured baffles forward of the opening, aid in providing a good mixture ratio control and performance.

1 Claim, 3 Drawing Figures

INVENTORS.
RONALD F. DETTLING
DONALD G. NYBERG
BY ROY MILLER
ATTORNEY.
GERALD F. BAKER
AGENT.

LIQUID FUEL INJECTOR SYSTEM

BACKGROUND OF THE INVENTION

A rocket of the controlled thrust type using a fuel injector system which the Rocket Encyclopedia Illustrated[1] calls "a unique variable-thrust, liquid propellant thrust-chamber assembly" has been developed by scientists at the Naval Weapons Center, China Lake, Calif. It is the purpose of this invention to provide a new, novel and more efficient injector for systems of this type.

[1] Rocket Encyclopedia Illustrated. John W. Herrick, ed. Los Angeles: Aero Publishers, Inc., 1959. pp. 559, 560.

The injector according to the present invention is an improvement over the device disclosed in U.S. Pat. No. 3,074,231 issued to David M. Klein, Jan. 22, 1963.

DETAILED DESCRIPTION

Figure 1:
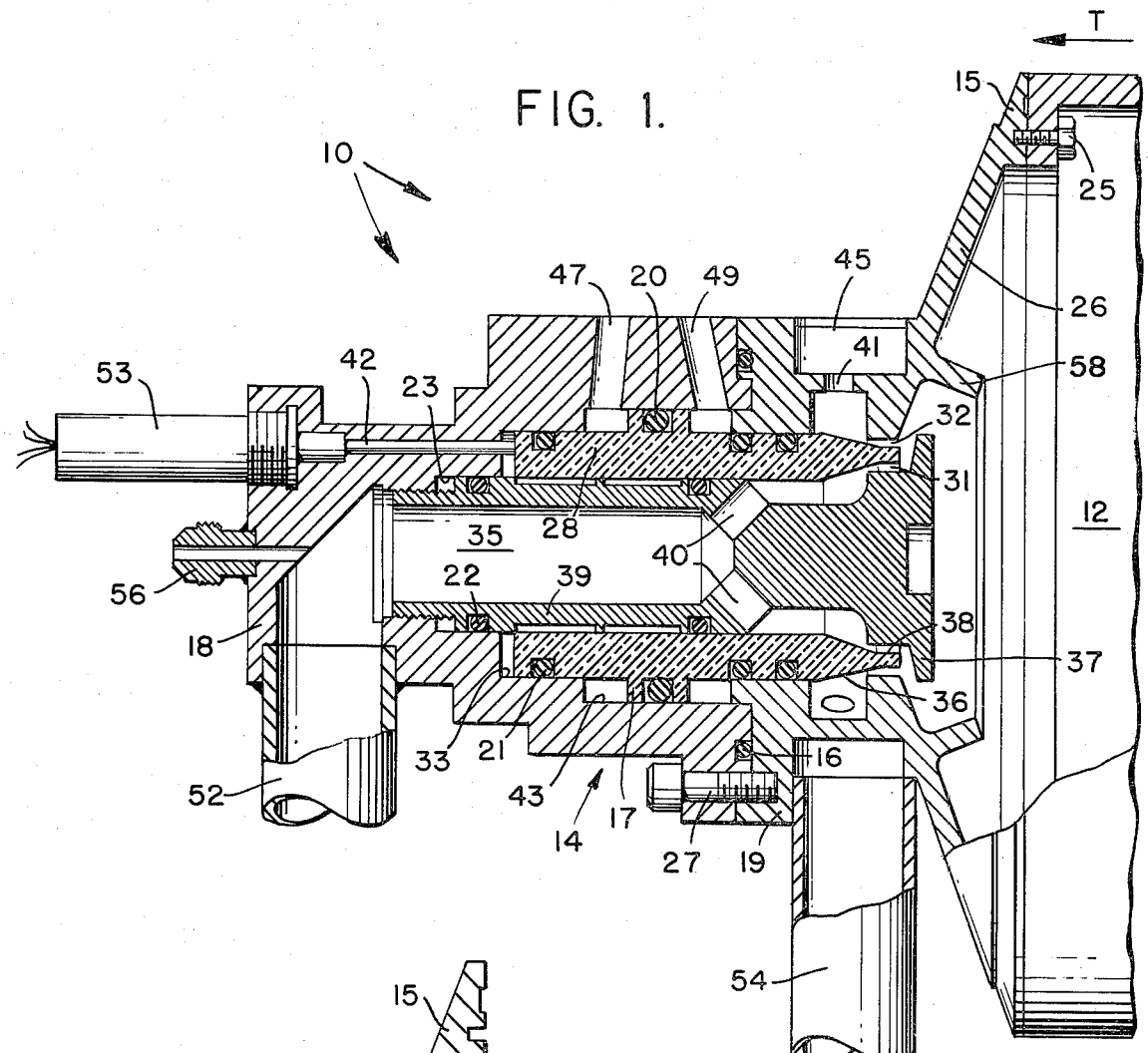
FIG. 1 is a side elevation with a portion shown in longitudinal section of a preferred embodiment of the device of the present invention attached to the front end of the rocket flight chamber.

Referring now to FIG. 1 of the drawing, the injector assembly 10 is shown secured to the forward end of a typical rocket engine flight chamber 12. The injector assembly 10 comprises a cylindrical casing 14 having a forward portion 18 and an after portion 19 which after portion terminates in a flange 15 which provides a fastening means for the flight chamber 12. Flight chamber 12 is affixed to flange 15 by a plurality of cap screws 25.

The body members 18, 19 are shown fastened together with cap screws 27 with a seal 16 between the sections. The body as assembled comprises a bore 23 and a counterbore 33. A core 39 is threadedly fastened within the bore 23 and a metering sleeve 28 substantially fills counterbore 33. A flange 17 is formed on the metering sleeve and partially fills an annular hydraulic chamber 43.

When hydraulic fluid is introduced under pressure through pipe 47 or 49 alternatively the flange 17 will be acted upon by the hydraulic force thus causing the sleeve 28 to move.

Sleeve 28 is so shaped that the longitudinal movement thereof serves to open or close concentric communicating passageways 31, 32 to separate sources of pressurized reactants. The shape of the metering end of sleeve 28 comprises a frusto conical surface 36 and a reduced diameter cylindrical tip 38. The metering end of sleeve 28 closes annular cylindrical passageways 31, 32. When the passageways 31, 32 are opened by the forward movement of the fuel metering sleeve 28, the passageways 40, 41 communicating with chambers 35, 45 respectively connected to pressurized supplies of first and second reactants through pipes 52, 54. The core member 39 carries a flange 37 which has a radial dimension slightly larger than the outer dimension of passageway 32. Thus, when the first reactant emerges through passageway 31 in a cylindrical sheet, the sheet of reactant is forced to spread peripherally by flange 37. The second reactant emerges from the opening 32 on the other side of sleeve 28 and impinges almost orthogonally upon the peripherally spread sheet of said first reactant.

The exothermic reaction tends to heat the core 39 and such heating can distort the opening between the core 39 and sleeve 28. It has been found advisable, therefore, to introduce a heat shield 55 of ceramic material or the like between flange 37 and the body of core 39. Likewise, heat shield 57 is used on member 15 to reduce heat flow during long engine operating times.

Hydraulic fluid is supplied to move sleeve 28 through pipes 47, 49 and movement of sleeve 28 is detected by electrical means 53, e.g., through feeler rod 42. Mating surfaces between sleeve 28 and the bore, counterbore or core members are provided with obturating means in the form of O-rings such as 20, 21 and 22 and, for smoother performance it has been found that a slipper ring (not shown) of Teflon or the like may be inserted between the O-ring and its adjacent sliding surface.

Figure 2:
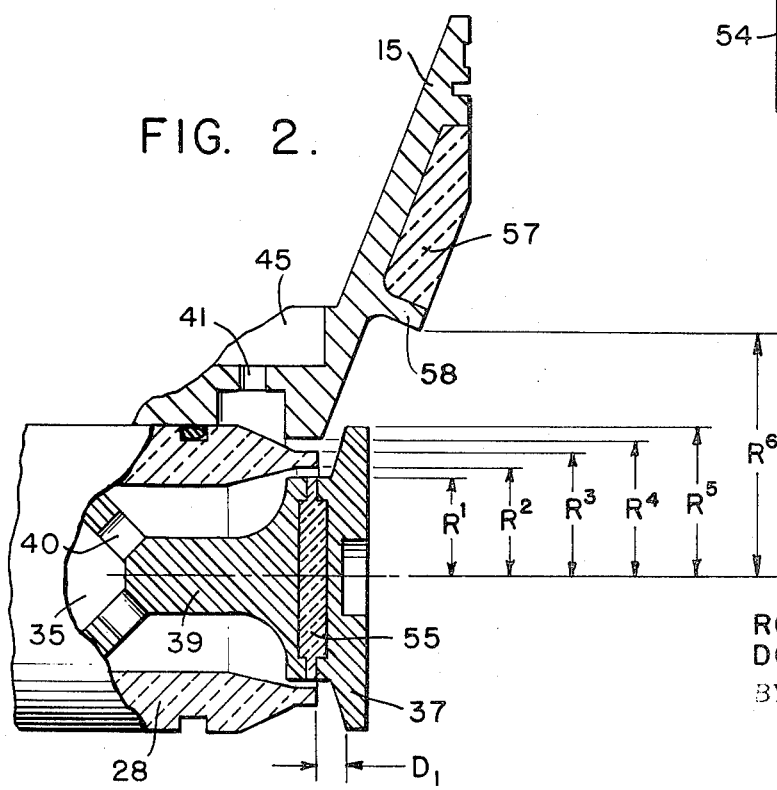
FIG. 2 is an enlarged detail view of a second embodiment.
Figure 3:
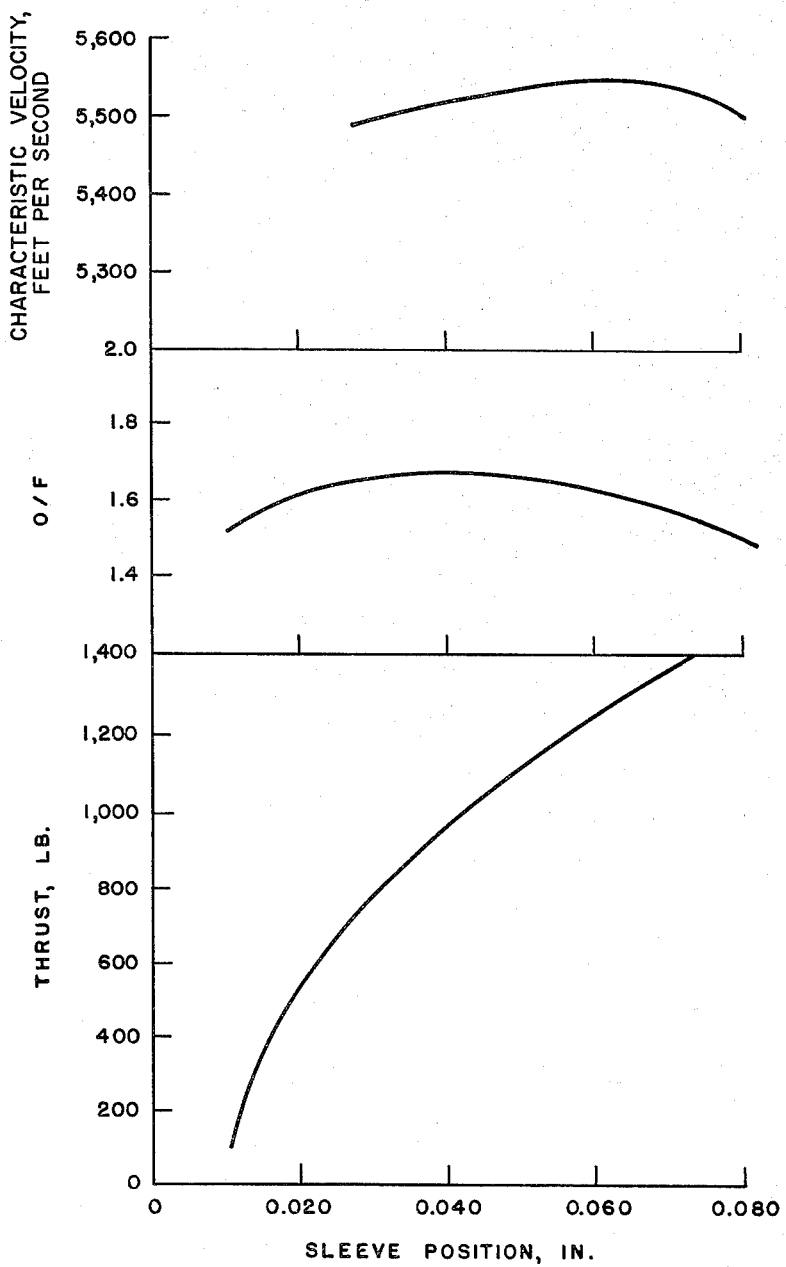
FIG. 3 is a graphic representation of injector performance.

The improvement afforded by this invention may be better understood by the identification of several critical dimensions, as shown in FIG. 2. These dimensions are designated by the characters $R^1$ through $R^6$ and by $D_1$.

The relationship between the respective amount of first and second reactant admitted through passages 31 and 32 (FIG. 1) is fixed by the conical angles on sleeve 28 and by the relative radii $R^1$ and $R^4$. For a specific pair of reactants, this reactant flow relationship must remain fixed at a certain value for maximum engine efficiency. The radii $R^2$ and $R^3$ of the cylindrical tip serve to maintain separation of the two reactants until the proper point is reached. Dimension $D_1$ forms a passage for one reactant such that the reactant forms a radial sheet. This dimension $D_1$ should be at least twice but not greater than 5 times the difference between radii $R^1$ and $R^2$. Also, $R^5$ must be slightly larger than $R^4$ so that substantially orthogonal impingement occurs. Further deflection of the combined streams of reactants is effected by a flange 58 located at distance $R^6$. This deflection by flange 58 to further mix the reactants and also to direct the reactant flow away from the flight chamber walls resulting in reduced heat flow along the chamber walls. The dimension $R^6$ should be approximately twice that of $R^4$ for best results.

What is claimed is:

1. Metering and injecting apparatus for bireactant gas generator comprising, in combination:

a body member having a bore and a counterbore;

pintle means in said bore and forming, with said counterbore, an annular cylindrical chamber defined by inner and outer opposing surfaces and an annular opening;

a valve member surrounding said pintle means and axially movable within said chamber;

said valve member having a tapered portion defined by inner and outer isogonic frustum surfaces;

said tapered portion mating with a cylindrical end piece;

said end piece protruding into said annular opening;

said valve member forming with said opening an inner annular metering channel and an outer annular metering channel, each of said channels having a receiving end and a discharge end;

said metering channels being parallel to each other for a distance along said end piece so that fluid will be discharged therefrom in a first path defined by parallel concentric cylindrical streams;

said channels being opened or closed under positioning of said valve member for metering reactant flow rate;

means for controllably moving said valve member; and first and second conduit means conveying first and second liquid propellants at substantially constant supply pressure to the receiving end of one and the other of said channels, respectively; said valve member with said frustoconical surfaces in cooperation with the edges of said annular opening constituting the sole means for metering the liquid propellants; and said pintle means including a flange member having a conical surface which extends across the path of both fluid streams; so that said streams will impinge individually and separately on said conical surface and be deflected substantially coincidentally along a second path.

* * * * *